Oct. 20, 1936. J. GASKELL 2,058,307
METHOD OF AND APPARATUS FOR CUTTING WIRED GLASS
Filed May 26, 1936 2 Sheets-Sheet 1
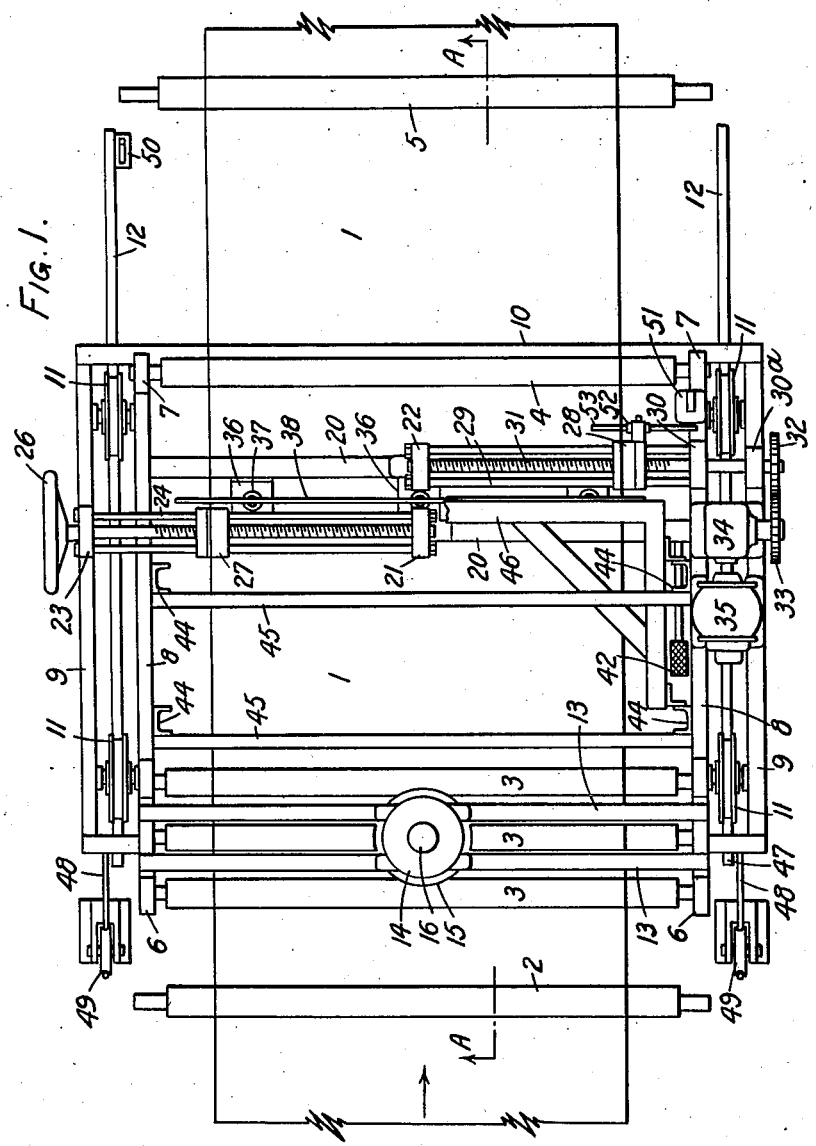
INVENTOR,
Joseph Gaskell
By
Morrison, Kennedy & Campbell,
Attorneys.

Oct. 20, 1936.  J. GASKELL  2,058,307
METHOD OF AND APPARATUS FOR CUTTING WIRED GLASS
Filed May 26, 1936  2 Sheets-Sheet 2
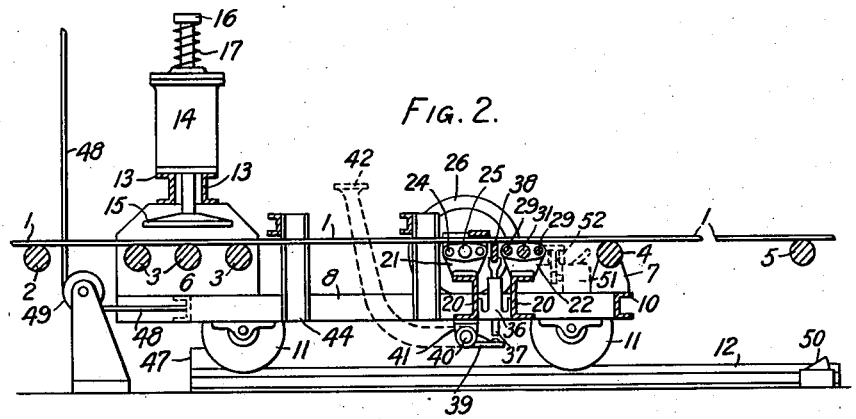
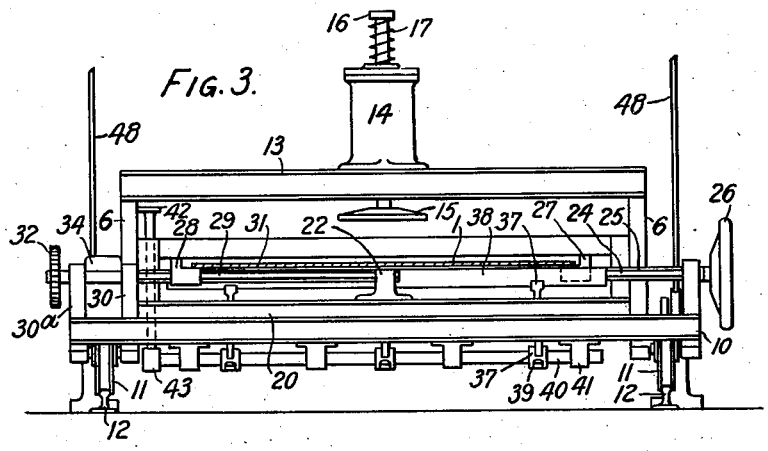
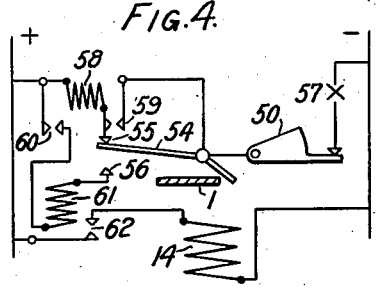
INVENTOR,
Joseph Gaskell
By Morrison, Kennedy & Campbell
Attorneys.

Patented Oct. 20, 1936

2,058,307

UNITED STATES PATENT OFFICE 2,058,307

METHOD OF AND APPARATUS FOR CUTTING WIRED GLASS

Joseph Gaskell, St. Helens, England, assignor to Pilkington Brothers Limited, Liverpool, England, a limited-liability company of England Application May 26, 1936, Serial No. 81,832
In Great Britain June 1, 1935

6 Claims. (Cl. 49—48)

This invention relates to the cutting of wired glass and has for its object an improved method and apparatus therefor.

In cutting wired glass, the glass is first scored and snapped, or electrically cracked, and then the wires of the net are broken or cut. They are sometimes broken by bending back and forth or by tearing them apart by separating the cut edges starting at one end of the cut. They can be cut only by drawing the cut edges apart sufficiently to enable a cutter to be inserted between them.

All these methods entail dragging the wires of the net out of the glass, with the result that the cut edge has ends of wires protruding from the glass. These are objectionable when handling the glass, and, for many purposes, the ends of wire have to be cut off before using the glass.

According to the invention, after the glass only has been cut, the wires are sheared by moving the cut edges relatively one to the other in the direction of the cut and in the plane of the glass. Thereby no force is exercised tending to separate the cut edges and therefore drag the wires out of the glass, and the wires are sheared off close to the surface of the cut edges.

The shearing is effected by two blocks engaging opposite side edges of the glass on opposite sides of the cut, one block being moved relatively to the other in a direction parallel to the cut, the two blocks engaging the edges so close to the cut that there is substantially no component of the shearing force perpendicular to the cut.

When the glass to be cut is a continuously moving strip, the shearing blocks are carried on a truck capable of a limited movement in the direction of motion of the strip, and means are provided for clamping the strip to the truck so that the cutting and shearing devices are stationary relatively to the strip during their operation. The clamping means is preferably a solenoid carried by the truck, which, when energized, presses a pad against the glass. The clamping of the truck to the strip is preferably controlled by a switch operated by the forward edge of the strip on reaching a predetermined position and its unclamping by a switch operated by the movement of the truck.

In the accompanying drawings:—

Figure 1 is a plan view of the apparatus;

Figure 2 is a longitudinal section thereof along the line A—A of Figure 1;

Figure 3 is an end view looking from the right hand end of Figure 1, and

Figure 4 is a diagram of the switch circuits.

Referring to the drawings, the strip of wired glass 1 (the wire net in it not being shown) passes in the direction of the arrow (Figure 1) from the lehr over a roller bed of which the last roller 2 is shown. It then passes over three rollers 3 at the lefthand end of the apparatus and over a roller 4 at the righthand end and passes to a roller conveyor, of which the first roller 5 is shown, by which the cut off length is removed. The rollers 3 and 4 are carried on brackets 6 and 7 respectively on the inner members 8 of a truck having outer members 9 and a cross member 10 at the righthand end. In Figure 3 the roller 4 and its brackets 7 and the roller 5 are omitted. The truck is carried on wheels 11 which run for a short distance on rails 12.

The brackets 6 carry a pair of girders 13 on which rests a solenoid 14. The core of this solenoid terminates below in a rod carrying a disc pad 15 and above in a rod 16 with spring 17 tending to raise the pad 15 off the glass strip 1. When the solenoid is energized, the pad 15 is forced on to the glass strip 1 and locks the truck on to the strip, so that the truck advances with the strip.

Two cross girders 20 carry central brackets 21 and 22 respectively. The bracket 21, and a bracket 23 on the outer member 9 carry a pair of rods 24, constituting a frame for the screw 25, which can be turned by a hand wheel 26. The screw 25 is threaded into an L-shaped shearing block 27 which can slide along the rods 24. By means of the hand wheel 26, the position of the shearing block 27 is adjusted so that its upstanding portion is just clear of the edge of the glass strip 1, while its lower portion is just below the strip. A similar shearing block 28 can slide on rods 29 carried by the bracket 22 and a bracket 30 on the inner truck member 8 on the other side. A screw 31 threaded into the shearing block 28 carries outside a bracket 30ª on the outer member 9 a gear wheel 32 driven by a gear wheel 33 on the shaft of a worm wheel in the casing 34, the worm thereof being driven by the motor 35.

Three brackets 36, carried between the girders 20, have vertical holes through which can slide three rods 37 which support a snapping bar 38. The lower ends of the rods 37 can be raised by arms 39 on a shaft 40 carried in brackets 41 fixed beneath the lefthand girder 20. A foot lever 42 is fixed at 43 to the shaft 40, so that, by pressing it downwards, the three arms 39 strike the rods 37 and raise the snapping bar 38 against the underside of the glass strip 1. The foot lever 42 is not within the view of Figure 2, but is shown in dotted lines.

Four vertical members 44 are attached to the inner members 8 and carry two cross girders 45 on which a platform (not shown) rests. Two of the vertical members 44 serve to hold a straight edge 46 above the glass strip, its edge being immediately above the snapping bar 38.

The truck is normally held in the position shown in Figure 2, with its lefthand wheels 11 against stops 47, by means of cables 48 passing under pulleys 49 and rising upwards to pass over pulleys and carry weights (not shown) which tend to draw the truck to the left. At the righthand end of one rail 12 is a switch 50 which is normally closed, but is adapted to be opened by one of the wheels 11, as this approaches the righthand end of the truck.

The motor 35 which drives the shearing block 28 is operated by a hand reversing switch box 51 and provision is made for its circuit to be opened, when the shearing block has returned to its normal position, by means of the roller 52 on the block 28 engaging the cam arm 53 on the switch box 51. These parts are shown in Figure 1 and in dotted lines (because not properly visible) in Figure 2.

Referring to Figure 4: 14 is the solenoid coil and 50 is the switch which is normally closed, but is opened when the truck 8, 9, reaches the righthand end of its track. A switch 54, with two contacts 55 and 56 is located to the right of Figure 1, in such a position that it is struck by the advancing edge of the strip 1 when the desired length has passed beyond the edge of the straight edge 46; the switch 54 is then moved to close the contact 56.

The operation of the apparatus is as follows:—
Assuming the starting switch 57 to be closed (and to remain permanently closed), and the strip to be advancing towards the switch 54; current passes through the switch 50, switch 54, contact 55 and relay coil 58 connected to the positive main. Relay coil 58 has two armatures adapted to close contacts 59 and 60. The contact 59 maintains the circuit through the relay coil 58 when contact 55 is broken. When the advancing strip of glass 1 strikes the switch 54, the switch is moved to close contact 56. Current then passes from the positive main through contact 60, relay coil 61, contact 56, switches 54 and 50 to the negative main. Relay coil 61 then being energized, its armature closes the contact 62 and current passes through the solenoid coil 14. Thereby the pad 15 locks the truck 8, 9, to the strip and the truck advances to the right with the strip. An operator then scores the strip by a cutter against the straight edge 46 and presses the foot lever 42 to raise the snapping bar 38 and snap the strip. He then, by the switch box 51, sets the motor 35 in operation to move the shearing block 28 against the edge of the strip. The snapped off length of strip is held to the main strip by the wire net, and the two portions of strip are put in shear in their own plane between the two shearing blocks 28 and 27. The wires of the net are thereby sheared off without being dragged out of the glass, and the two cut edges of the strip are left free of any protruding ends of wire. The shearing block 28 may be moved by pneumatic or hydraulic pressure instead of by the screw and motor shown.

As soon as the shear has been effected, the operator reverses the motor and the shearing block 28 returns to its normal position, opening the motor circuit by means of the roller 52 and cam arm 53. The sheared off length of strip is advanced by the conveyor rollers 5 and the truck 8, 9, advances until the wheel 11 opens the switch 50. Thereby the circuit through the relay coil 58 is opened, opening contacts 59 and 60, thus opening the circuit of the relay coil 61 and opening the contact 62 of the solenoid circuit. The pad 15 is thereby released from the strip and the truck 8, 9, is moved back to its normal position against the stops 47 by the cables 48. As soon as the truck begins to move back, the switch 50 is again closed; if the sheared off length of strip is still under the switch 54, the circuit through the relay coil 58 is maintained open. As soon as the sheared off length has released the switch 54, this circuit is again closed, closing contacts 59 and 60, whereby the operation is repeated, as soon as the advancing edge of the strip moves switch 54 to close contact 56.

The shearing devices forming part of the apparatus described may be employed on a stationary framework when only strips of glass other than a moving strip have to be cut.

Having described my invention, I declare that what I claim and desire to secure by Letters Patent is:—

1. Method of cutting wired glass in which the glass only is first cut, characterized by shearing the wires by moving the cut edges relatively one to the other in the direction of the cut and in the plane of the glass.

2. Apparatus for cutting wired glass in which the glass only is first cut, comprising in combination two shearing blocks, one adapted to engage one side edge on one side of the cut and the other the other side edge on the other side of the cut, and means for moving one shearing block relatively to the other in a direction parallel to the cut, to shear the wires, the two shearing blocks engaging the edges so close to the cut that there is substantially no component of the shearing force perpendicular to the cut.

3. Apparatus for cutting a continuously moving strip of wired glass in which the glass only is first cut, comprising in combination two shearing blocks, one adapted to engage one side edge on one side of the cut and the other the other side edge on the other side of the cut, means for moving one shearing block relatively to the other in a direction parallel to the cut to shear the wires, a truck on which said shearing blocks are carried said truck being capable of a limited movement in the direction of motion of the strip, and means for clamping the strip to the truck so that the shearing devices are moved with the strip during their operation.

4. Apparatus for cutting a continuously moving strip of wired glass in which the glass only is first cut, comprising in combination two shearing blocks, one adapted to engage one side edge on one side of the cut and the other the other side edge on the other side of the cut, means for moving one shearing block relatively to the other in a direction parallel to the cut to shear the wires, a truck on which said shearing blocks are carried said truck being capable of a limited movement in the direction of motion of the strip, a solenoid on the truck and a pad adapted to be pressed by the solenoid against the strip when the solenoid is energized to clamp the strip to the truck.

5. Apparatus for cutting a continuously moving strip of wired glass in which the glass only is first cut, comprising in combination two shearing blocks, one adapted to engage one side edge on one side of the cut and the other the other side edge on the other side of the cut, means for moving one shearing block relatively to the other in a direction parallel to the cut to shear the wires, a truck on which said shearing blocks are carried said truck being capable of a limited movement in the direction of motion of the strip, means for clamping the strip to the truck so that the shearing devices are moved with the strip during their operation, a switch operated by the forward edge of the strip when said edge reaches a predetermined position adapted to control the clamping of the strip to the truck and a switch operated by the movement of the truck adapted to control the unclamping of the strip.

6. Apparatus for cutting a continuously moving strip of wired glass in which the glass only is first cut, comprising in comibnation two shearing blocks, one adapted to engage one side edge on one side of the cut and the other the other side edge on the other side of the cut, means for moving one shearing block relatively to the other in a direction parallel to the cut to shear the wires, a truck on which said shearing blocks are carried said truck being capable of a limited movement in the direction of motion of the strip, a solenoid on the truck, a pad adapted to be pressed by the solenoid against the strip when the solenoid is energized to clamp the strip to the truck, a switch adapted to be operated by the forward edge of the strip when said edge reaches a predetermined position to energize the solenoid and a switch adapted to be operated by the movement of the truck to de-energize the solenoid.

JOSEPH GASKELL.